United States Patent [19]

Sakamura et al.

[11] Patent Number: 5,176,604
[45] Date of Patent: Jan. 5, 1993

[54] TOOL REPLACEMENT FOR A MULTI-STAGE PRESS MACHINE

[75] Inventors: Yshikazu Sakamura, Osaka; Yuzo Kimura, Kyoto, both of Japan

[73] Assignee: K. K. Sakamurakikai Seisakusho, Japan

[21] Appl. No.: 896,874

[22] Filed: Jun. 10, 1992

Related U.S. Application Data

[63] Continuation of Ser. No. 738,146, Jul. 30, 1991, abandoned.

[30] Foreign Application Priority Data

Mar. 29, 1991 [JP] Japan .............................. 3-028669[U]

[51] Int. Cl.⁵ ............................................ B23Q 3/155
[52] U.S. Cl. ........................................ 483/29; 72/446; 83/549
[58] Field of Search ............... 483/28, 29, 13, 14, 483/15; 83/549, 552, 563, 679, 698; 72/446, 462, 448

[56] References Cited

U.S. PATENT DOCUMENTS

| | | | |
|---|---|---|---|
| 3,834,218 | 9/1974 | Kralowetz et al. | 483/29 |
| 4,304,041 | 12/1981 | Kline et al. | 483/13 |
| 4,387,502 | 6/1983 | Dom | 483/29 |

FOREIGN PATENT DOCUMENTS

| | | | |
|---|---|---|---|
| 312861 | 4/1989 | European Pat. Off. | 29/568 |
| 377865 | 7/1990 | European Pat. Off. | 29/568 |
| 3007871 | 9/1981 | Fed. Rep. of Germany | 72/446 |
| 57-177842 | 11/1982 | Japan . | |
| 59-10942 | 1/1984 | Japan . | |
| 59-33037 | 2/1984 | Japan . | |
| 59-94744 | 6/1984 | Japan . | |
| 59-118240 | 7/1984 | Japan . | |
| 60-80038 | 6/1985 | Japan . | |
| 60-99035 | 7/1985 | Japan . | |
| 60-177926 | 9/1985 | Japan . | |
| 61-182639 | 11/1986 | Japan . | |
| 1-177037 | 12/1989 | Japan . | |
| 108423 | 4/1990 | Japan | 29/568 |
| 2-133239 | 11/1990 | Japan . | |
| 10735 | 4/1991 | Japan | 29/568 |
| 335463 | 7/1991 | Japan . | |
| 3-116239 | 12/1991 | Japan . | |

*Primary Examiner*—William Briggs
*Attorney, Agent, or Firm*—Barnes & Thornburg

[57] ABSTRACT

The invention provides an automatic replacement system for automatically and efficiently replacing a bar cutter and a material transfer unit as well as all or part of plural dies and punches attached to a multi-stage press forming machine. The automatic replacement system includes a carrier for conveying tools between a multi-stage press station A including plural dies and punches and tool replacements stations B and C disposed in the vicinity of the press station A; first engagement means for detachable connecting a jig for conveying dies or punches with a material transfer unit; and second engagement means for detachable connecting the carrier with a bar cutter.

16 Claims, 13 Drawing Sheets

TOOL REPLACEMENT FOR A MULTI-STAGE PRESS MACHINE

This is a continuation of application Ser. No. 07/738,146, filed Jul. 30, 1991 now abandoned.

BACKGROUND OF THE INVENTION

The present invention relates to an automatic tool replacement system for automatically replacing tools such as dies and punches used in a multi-stage press forming machine, which press-works material step by step to continuously form products or parts of various shapes with an array of plural dies and punches disposed against each other.

A multi-stage press forming machine includes a multi-stage press station equipped with plural dies disposed at preset locations on a base thereof and the same number of punches each opposed to the corresponding die and mounted on the front face of a ram pushed forward and backward against the dies. A material bar supplied from the back of the base is cut in given lengths by a bar cutter mounted on an end of the base, and successively fed into each stage of the press station by a material transfer unit. The cut pieces are press-worked at the multi-stage press station step by step and continuously formed into a final product with a given shape. Such multi-stage press forming machines can make various products of different shapes by replacing its dies and punches. Various tool replacement apparatus and systems have been proposed for quicker, more efficient replacement of dies and punches and thereby for improving the production efficiency.

When products of a different shape are to be manufactured, the bar cutter for cutting a material bar in given lengths and the material transfer unit for feeding the cut pieces to the multi-stage press station need to be replaced as well as dies and punches, since different products require material bars of different size and quality. Although dies and punches are relatively readily replaced with a conventional replacement system, replacement of the bar cutting mechanism and the material transfer unit requires both time and labor. Thus a total replacement system with a high replacing efficiency has been demanded.

SUMMARY OF THE INVENTION

Accordingly, an objective of the invention is to provide an improved labor- and time-saving automatic tool replacement system for automatically replacing various tools including dies and punches in a multi-stage press forming machine.

Another objective of the invention is to provide an automatic tool replacement system for efficiently replacing a bar cutter and a material transfer unit, as well as dies and punches, mounted on the multi-stage press station of a multi-stage press forming machine.

The invention attains these and other objectives with an improved automatic tool replacement system for a multi-stage press forming machine. The multi-stage press forming machine according to the present invention includes:

a multi-stage press station with plural dies disposed at given locations on a base, and plural punches each opposed to the corresponding die and mounted on the front face of a ram moved forward and backward against the dies;

a bar cutter detachably mounted on the base for cutting a material bar supplied from a back end of the base in given lengths; and a material transfer unit for successively feeding the material bar cut in given lengths to the multi-stage press station and transferring the cut pieces between adjacent stage of dies, whereby the cut pieces are press-worked step by step to form products of a given shape. The automatic tool replacement system of the present invention is characterized in that the system further includes:

a replacement tool station located in the vicinity of the multi-stage press station;

a carrier for conveying tools including the dies and the punches, the material transfer unit, and the bar cutter between the multi-stage press station and the replacement tool station;

a jig for holding plural dies and punches in a disposition corresponding to the locations of the dies on the base and the punches on the ram;

plural engagement members corresponding to the plural dies and punches, each being attached to the carrier for engaging with the corresponding die or punch;

driving means mounted on the carrier for driving each engagement member so as to transfer the corresponding die or punch between the base or ram and the jig;

first engagement means for detachably connecting the carrier with the jig or the material transfer unit; and second engagement means for detachably connecting the carrier with the bar cutter.

The automatic tool replacement system may further have locating means including a locating member fixed at a predetermined position of the base and an engagement member fixed at a predetermined position of the jig for engaging with the locating member for determining a proper position of the jig to the multi-stage press station. The automatic tool replacement system may be equipped with a detector mounted on the carrier or the jig for detecting left-out of the die or the punch or any part thereof on the base or the ram after detachment of the die or punch from the base or the ram.

The automatic tool replacement system of the invention may also be provided with a cleaning unit. The cleaning unit is transported to the multi-stage press station after the die and punch and cleans are detached, and cleans the die attachment site of the base and the punch attachment site of the ram by spraying compressed air or high-pressure cleaning oil.

The automatic replacement system may alternatively include two replacement tool stations, that is, a first replacement tool station for the material transfer unit and a second replacement tool station for the jig and the bar cutter. The first replacement tool station includes a turntable for turning the material transfer unit and lifting means for lifting an end of the material transfer unit on the turntable.

In the automatic replacement system thus constructed, the material transfer unit is replaced in the following manner. The carrier is moved to the predetermined attachment position on the base, connected to the material transfer unit with the first engagement means, and moved back to the replacement tool station with the material transfer unit. A new material transfer unit previously placed on the replacement tool station is then connected to the carrier with the first engagement means, transported to the attachment position on the base by the carrier, and attached at the predetermined position onto the base.

Replacement of the bar cutter is accomplished in a similar manner. The carrier is moved to the predetermined attachment position of the bar cutter on the base, connected to the bar cutter with the second engagement means, and moved back to the replacement tool station with the bar cutter. A new bar cutter previously placed on the replacement tool station is then connected to the carrier with the second engagement means, transported to the attachment position on the base by the carrier, and attached at the predetermined position onto the base.

The dies mounted on the base and the punches mounted on the ram are replaced by the following method. The carrier is connected to the jig with the first engagement means and moved to the press station. The jig is exactly positioned in the multi-stage press station between the dies and the punches opposed to each other, and each engagement member mounted on the carrier engages with the corresponding die or punch. By driving engagement members using the corresponding driving means, all or part of the dies and punches are detached from the base and the ram, and securely held by the jig. The number of the dies or punches to be replaced is controllable by varying the number of the engagement members driven by the driving means.

The jig holding the dies and the punches detached from the base or the ram is transported by the carrier to the replacement tool station, where the jig with the detached dies or punches held thereon is replaced with another jig with new dies or punches held thereon. The jig with the new dies or punches is then transported by the carrier to the press station. Each engagement member is driven by the driving mechanism and attaches the corresponding new die or punch onto the base or the ram at the predetermined position. In the manner as described above, any number of dies or punches mounted on the base or the ram are automatically replaced. For example, only part of the dies or punches which do not properly work due to abrasion or damage may be replaced, or all of them may be replaced in order to pressform products of a different shape. Any replacement of the dies or punches is efficiently accomplished simply by moving the carrier and the jig supported thereby between the press station and the replacement tool station.

The locating means optionally included in the automatic tool replacement system precisely determines the proper position of the jig on the press station even when the first engagement means connecting the jig and the carrier is worn. Since the jig is always exactly located on the press station, the dies and punches are assuredly detached from and attached to the base and the ram.

When the automatic tool replacement system includes the detector, it effectively detects left-out of the die or the punch or any part thereof on the base or ram. When the detector detects the left-out, transportation of the jig by the carrier is inhibited, and accordingly damage to the die, the punch, or the jig is effectively prevented.

The cleaning unit cleans the die attachment site of the base and the punch attachment site of the ram so as to effectively remove dust or slug which may cause damage. Accordingly, the new dies or the punches are smoothly and assuredly attached to the base or the ram.

If the automatic replacement system includes two replacement tool stations, that is, the first replacement tool station for the material transfer unit and the second replacement tool station for the jig and the bar cutter, maintenance and inspection for respective components are efficiently performed. When the first replacement tool station further includes the turntable for turning the material transfer unit and lifting means for lifting an end of the material transfer unit on the turntable, replacement of the material transfer unit and maintenance or inspection thereof are more efficiently accomplished.

BRIEF DESCRIPTION OF THE DRAWINGS

The invention may be best understood by referring to the following detailed description of the preferred embodiment and the accompanying drawings, wherein like numerals denote like elements and in which.

DETAILED DESCRIPTION OF A PREFERRED EMBODIMENT

Figure 1:
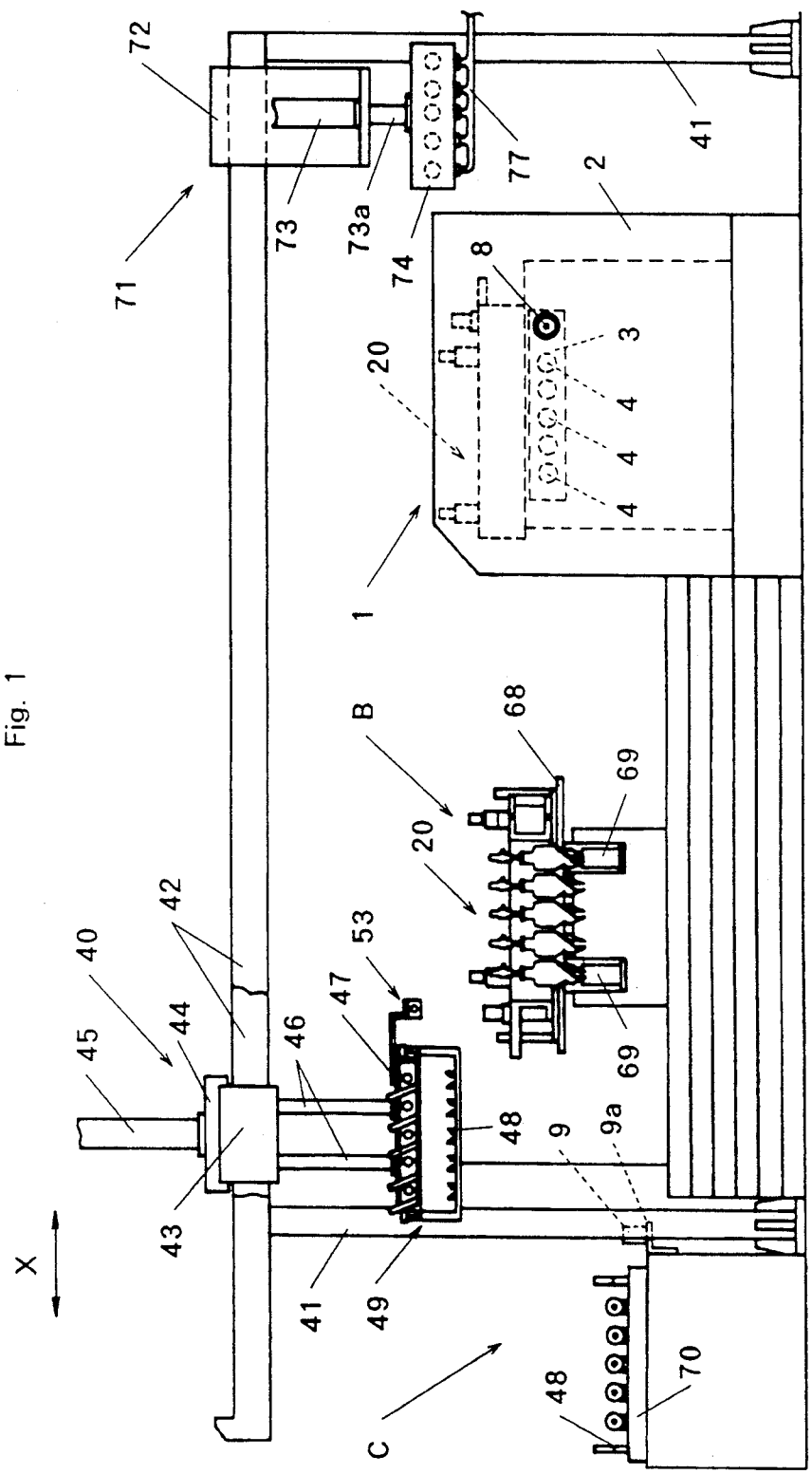
FIG. 1 is a front view showing a multi-stage press forming machine equipped with an automatic tool replacement system embodying the present invention.

A preferred embodiment of the invention is now explained in detail referring to the drawings.

Since there may be various modifications and changes without departing the scope of the invention, the embodiment below is not intended to limit the invention to the embodiment but is intended to illustrate the invention more clearly.

Figure 2:
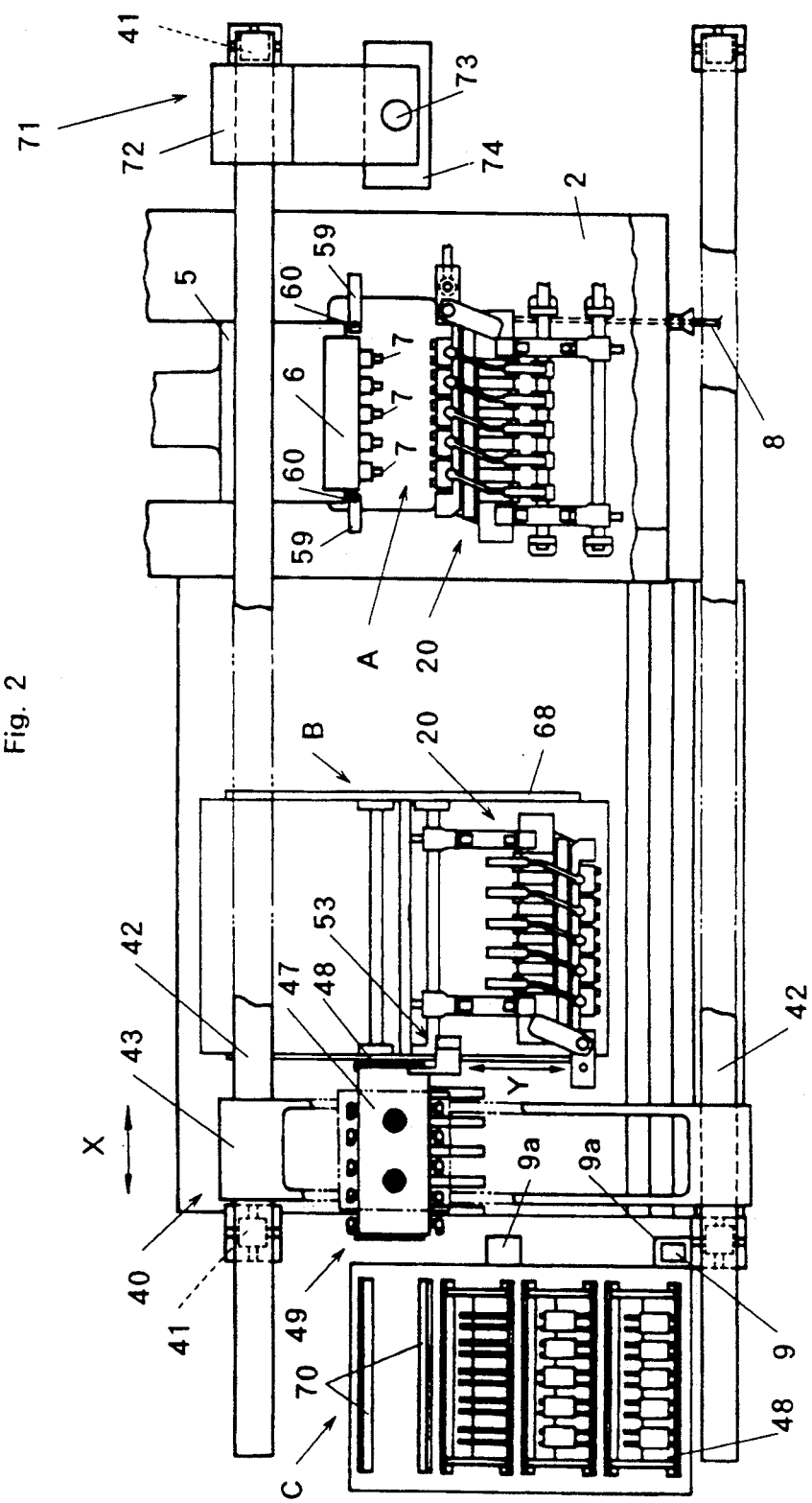
FIG. 2 is a plan view showing the multi-stage press forming machine equipped with the automatic tool replacement system of FIG. 1.
Figure 3:
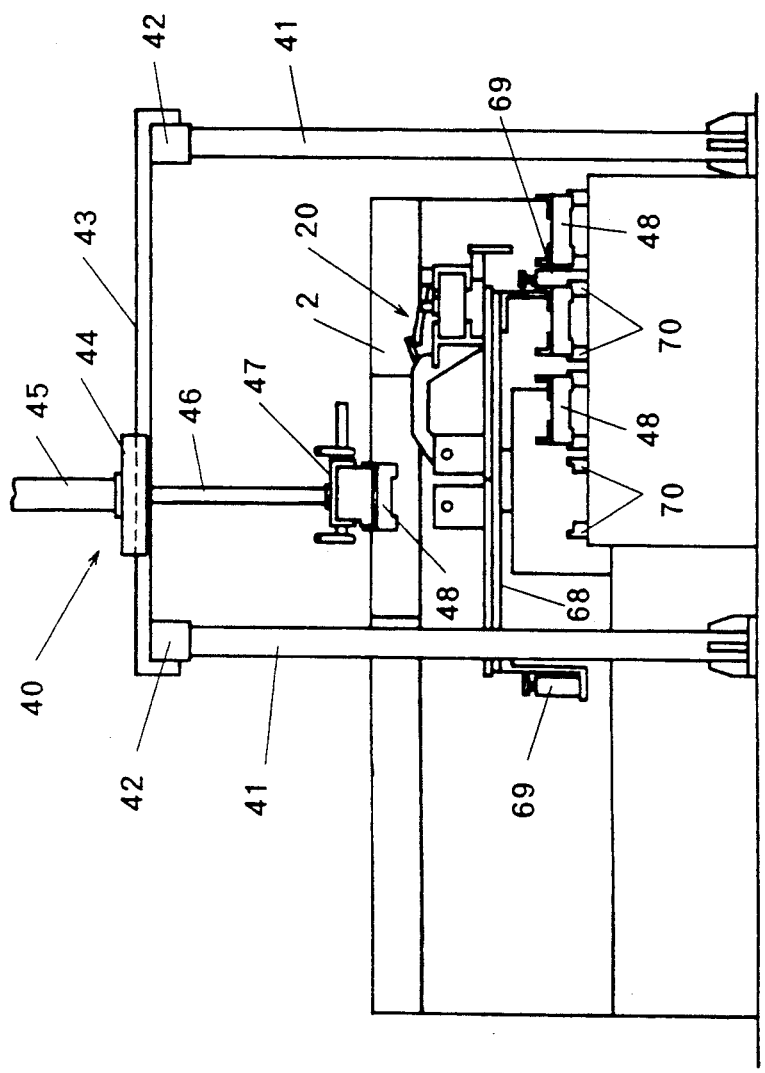
FIG. 3 is a side view showing the multi-stage press forming machine equipped with the automatic tool replacement system of FIG. 1.

FIGS. 1 through 3 show a multi-stage press forming machine equipped with an automatic tool replacement system embodying the present invention. The multi-stage press forming machine 1 has a multi-stage press station A (shown in FIG. 2) including: plural dies 4 (as an example, five dies shown in FIG. 1) disposed straight at given intervals at predetermined locations in a die block 3 on a base 2; and plural punches 7 mounted on the front face of a ram 5 pushed forward and backward against the dies 4 and are aligned by a punch holder 6 in such a manner that each punch 7 is opposed to the corresponding die 4. A material bar 8 is supplied at regular time intervals from a back end of the base 2 through a material bar feeding device (not shown) towards the press station A, and is cut in given lengths by a bar cutter 9 (shown in FIGS. 5 and 6), which is described later. The cut pieces are successively fed to the axial front of the first die 4 on the press station A by a material transfer unit 20 placed above the die block 3. The cut piece is press-worked between the die 4 and the corresponding punch 7 opposed thereto, and then transferred to the next stage of the die and punch. Thus the material pieces are transferred step by step between adjacent stages to form a product of a given shape.

The bar cutter 9 and the material transfer unit 20 are described in detail.

Figure 5:
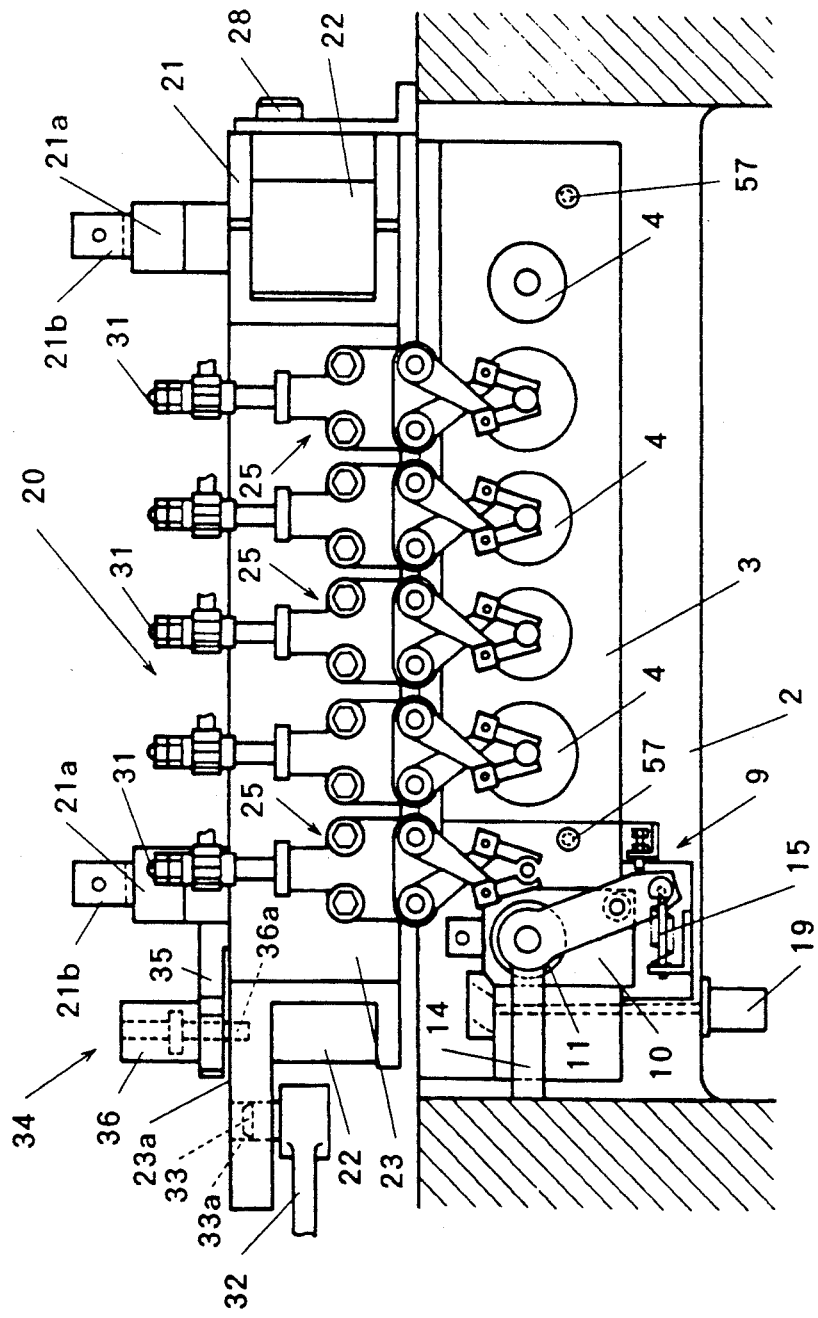
FIG. 5 is an enlarged cross-sectional view showing the main structure of the bar cutter and the material transfer unit of FIG. 1 and FIG. 2.
Figure 6:
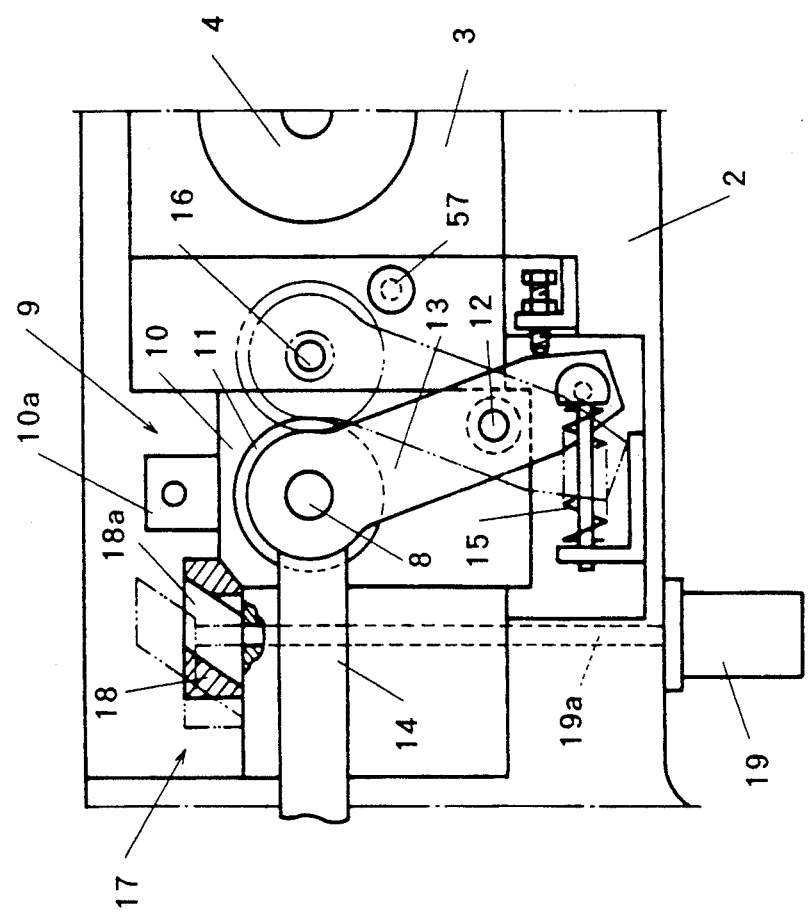
FIG. 6 is an enlarged cross-sectional view showing the main structure of the bar cutter of FIG. 5.

The bar cutter 9, as shown in FIGS. 5 and 6, includes: a quill case 10 mounted adjacent to the first die 4 on an end of the die block; a quill 11 fixed to the quill case 10 and through which the material bar 8 supplied from a back end of the base 2 passes; a cutter 13 which rotates on a support shaft 12 for cutting the material bar coming out of the quill 11; a drive rod 14 for pushing the cutter 13 from the solid line position to the broken line position in FIG. 6; and a coil spring 15 for restoring the cutter 13 from the broken line position to the solid line position. The material bar 8 is cut in given lengths by the cutter 13 rotated by the drive rod 14. and the cut pieces are moved forward by a push pin 16 adjacent to the quill 10. The quill case 10 is detachably locked onto the base 2 with a locking mechanism 17. The locking mechanism 17 includes: a lock member 18 with a taper hole; and a cylinder 19 with a piston rod 19a having a rhombus member 18a at the tip thereof for engaging with the lock member 18. The quill case 10 is locked to the base 2 by the engagement of the rhombus member 18a with the lock member 18. The quill case 10 is unlocked and detached from the base 2 by pushing the piston rod 19a above and thereby moving the lock member 18 as shown by the broken line of FIG. 6. An engagement piece 10a is integrally formed on the upper face of the quill case 10, which will be explained later.

Figure 4:
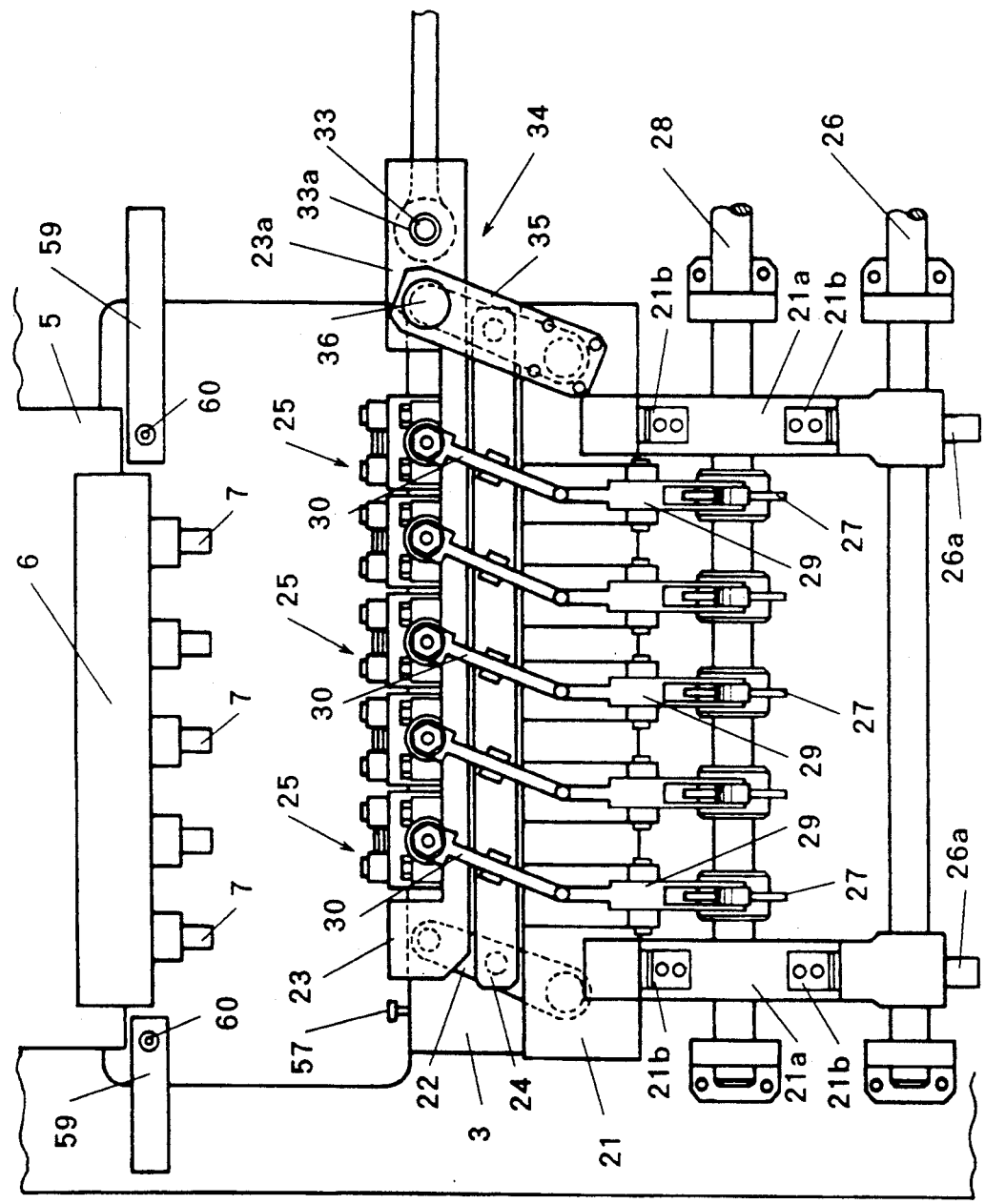
FIG. 4 is an enlarged plan view of the material transfer unit of FIG. 2.
Figure 7:
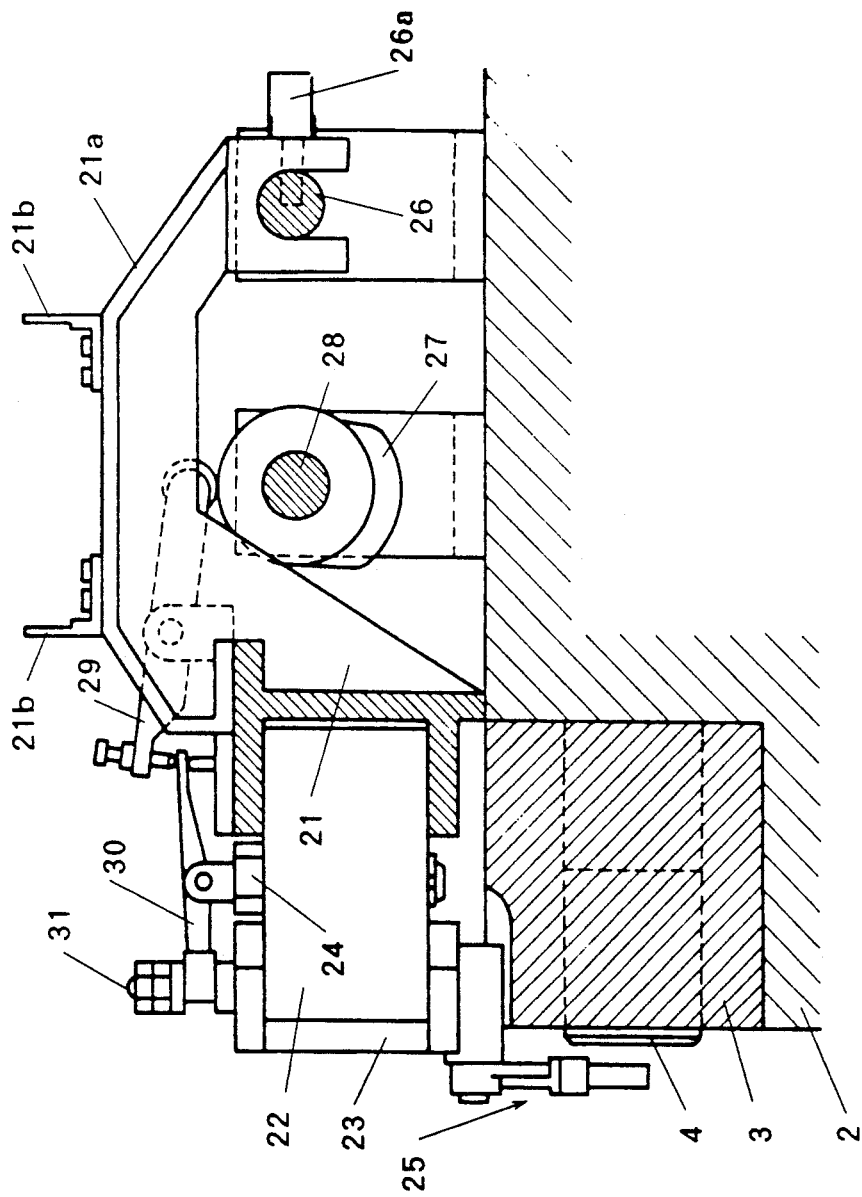
FIG. 7 is an enlarged cross-sectional view showing the main structure of the material transfer unit of FIG. 5.

The material transfer unit 20, as shown in FIGS. 4, 5, and 7, includes: a support frame 21 mounted on the base 2; a pair of pivot arms 22. 22 each one end thereof pivotally fixed on both ends of the support frame 21., a movable frame 23 each end thereof rotatably supported on the other end of each pivot arm 22 for moving along the alignment of the dies 4; an intermediate frame 24 disposed between the movable frame 23 and the support frame 21, each end thereof rotatably supported by the pair of the pivot arms 22, 22; and plural chucks 25, in the same number as the dies 4, fixed on the front face of the movable frame 23 at the same intervals as those of the plural dies 4 for transferring the cut pieces between adjacent stages. A pair of arms 21a, 21a projecting backward are respectively attached to each side of the support frame 21. Each back end of the arms 21a is fixed to a support shaft 26 mounted on the back of the base 2 with a cylinder 26a.

A cam shaft 28 is mounted behind the support frame 21 on the base 2, and plural cams 27 are fixed thereon for opening and closing the corresponding chucks 25. Plural cam arms 29 pivotally moved by the cams 27 are supported on the upper face of the support frame 21 at given intervals, and plural locker arms 30 each being in contact with the tip of each cam arm 29 are pivotally supported on the intermediate frame 24 at given intervals. A rod member 31 projecting upward from the upper end of each chuck 25 is fixed to the end of each locker arm 30. Rotation of the cam shaft 28 causes: the cams 27 to rotate; the cam arms 29 and the locker arms 30 to pivotally move; and the rod members 31 to vertically move, thus allowing the chucks 25 to open (FIG. 7).

The movable frame 23 supported on the pivot arms 22, 22 swings back and forth along the support frame 21 between the adjacent dies synchronized with the movement of the ram 5. The movable frame 23 and a driving rod 32 for driving the movable frame 23 are connected as explained below.

As shown in FIGS. 4 and 5, an engagement pin 33 projecting from the driving rod 32 is fitted in an engagement hole 33a formed on an end of the movable frame 23. As the driving rod 32 moves back and forth with a stroke corresponding to the distance of adjacent dies 4 at a predetermined timing synchronized with the movement of the ram 5, the movable frame 23 swings accordingly.

A locking mechanism 34 is mounted on the upper face 23a of the movable frame 23 for fixing the movable frame 23 to the support frame 21 when necessary. The locking mechanism 34 includes: a base member 35 with one end thereof fixed on one end of the support frame 21; and a cylinder 36 fixed to the upper end of the base member 35 and located on the upper face 23a of the movable frame 23. The movable frame 23 and the support frame 21 are fixed to each other by engaging the lower end of a piston rod 36a of the cylinder 36 with the upper face 23a of the movable frame 23. A pair of engagement pieces 21b, 21b are respectively fixed on the upper face of each of the two arms 21a, 21a.

As seen in FIGS. 1 through 3, a first replacement tool station B for the material transfer unit 20 and a second replacement tool station C for the dies 4 and punches 7 and the bar cutter 9 are disposed adjacent to the press station A. A conveyor 40 connects the press station A to the first replacement tool station B or to the second replacement tool station C. The conveyor 40 includes: a pair of parallel rails 42, 42 fixed on columns 41 standing at the sides of the press forming machine 1 and the second replacement tool station C and laid from above the press station A to above the second replacement tool station C; and a first moving body 43 supported between the rails 42, 42 and movable in the direction X (see FIGS. 1 and 2) along the rails 42, 42 by an appropriate driving means (not shown); and a second moving body 44 movable in the direction Y (see FIG. 2) on the first moving body 43 by an appropriate driving means (not shown). A carrier 47 is fixed on the lower ends of a pair of rods 46, 46 suspended from the second moving body 44 and moved vertically by a cylinder 45.

Figure 8:
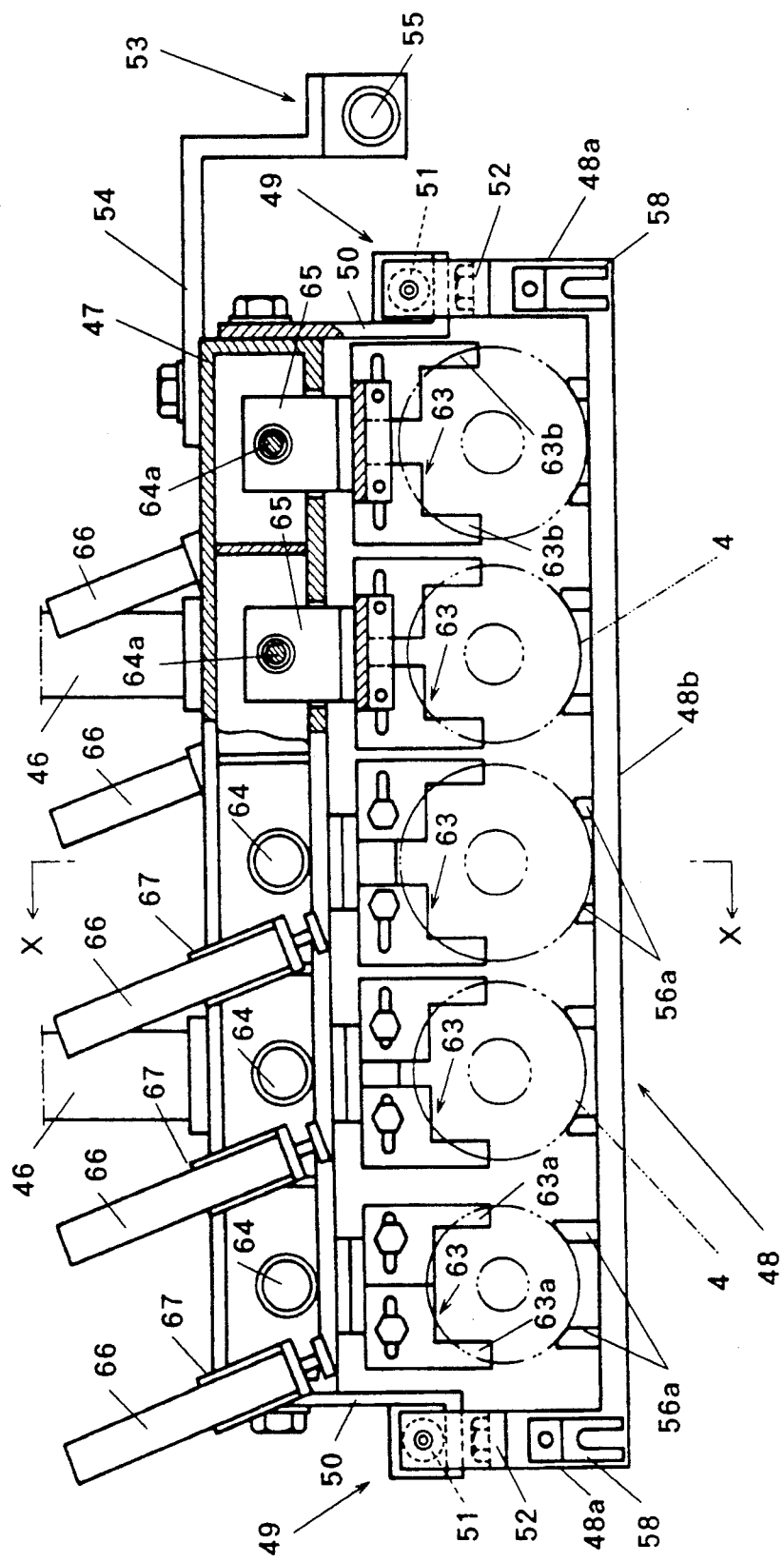
FIG. 8 is an enlarged front view, partly in section, showing a carrier and a jig in the automatic tool replacement system.
Figure 9:
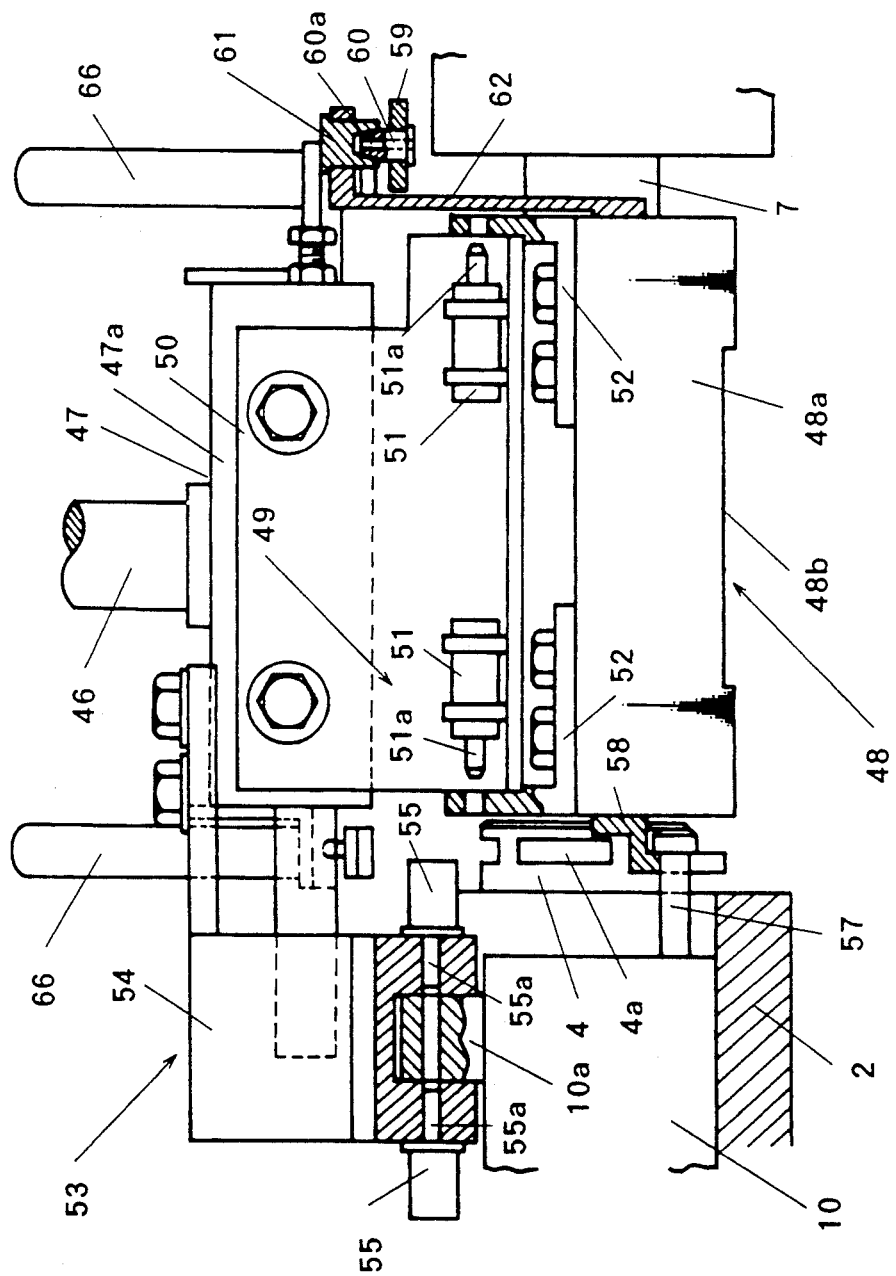
FIG. 9 is a right side view, partly in section, showing the carrier and the jig of FIG. 8.

A jig 48 is detachably mounted on the carrier 47 ±or holding a die or dies of the base 2 and a punch or punches 7 of the ram 5 with the punch holder 6. A first engagement unit 49 is disposed between the carrier 47 and the jig 48 for connecting or disconnecting the carrier 47 to or from the jig 48. The first engagement unit 49, as shown in FIGS. 8 and 9, has: a pair of fixing cylinders 51, 51 mounted on each side wall 47a of the carrier 47 via brackets 50, 50, and a pair of engagement pieces 52, 52 which are mounted on the upper face of each side wall 48a of the jig 48. The jig 48 is detachably connected with the carrier 47 by fitting the piston rods 51a of the cylinders 51 in and out of the engagement pieces 52. The material transfer unit 20 is also detachably connected with the carrier 47 by fitting the piston rods 51a of the cylinders 51 in and out of the engagement pieces 21b (see FIGS. 4 and 5) fixed on the upper face of the arms 21a. The carrier 47 further includes, as shown in FIGS. 8 and 9, a second engagement unit 53 for detachably mounting the bar cutter 9 on the carrier 47. The second engagement unit 53 has a pair of fixing cylinders 55, 55 fixed to the carrier 47 via a bracket 54. The bar cutter 9 is detachably connected with the carrier 47 by fitting a piston rod 55a of each fixing cylinder 55 in and out of the engagement piece 10a integrally formed on the quill case 10 of the bar cutter 8.

Figure 10:
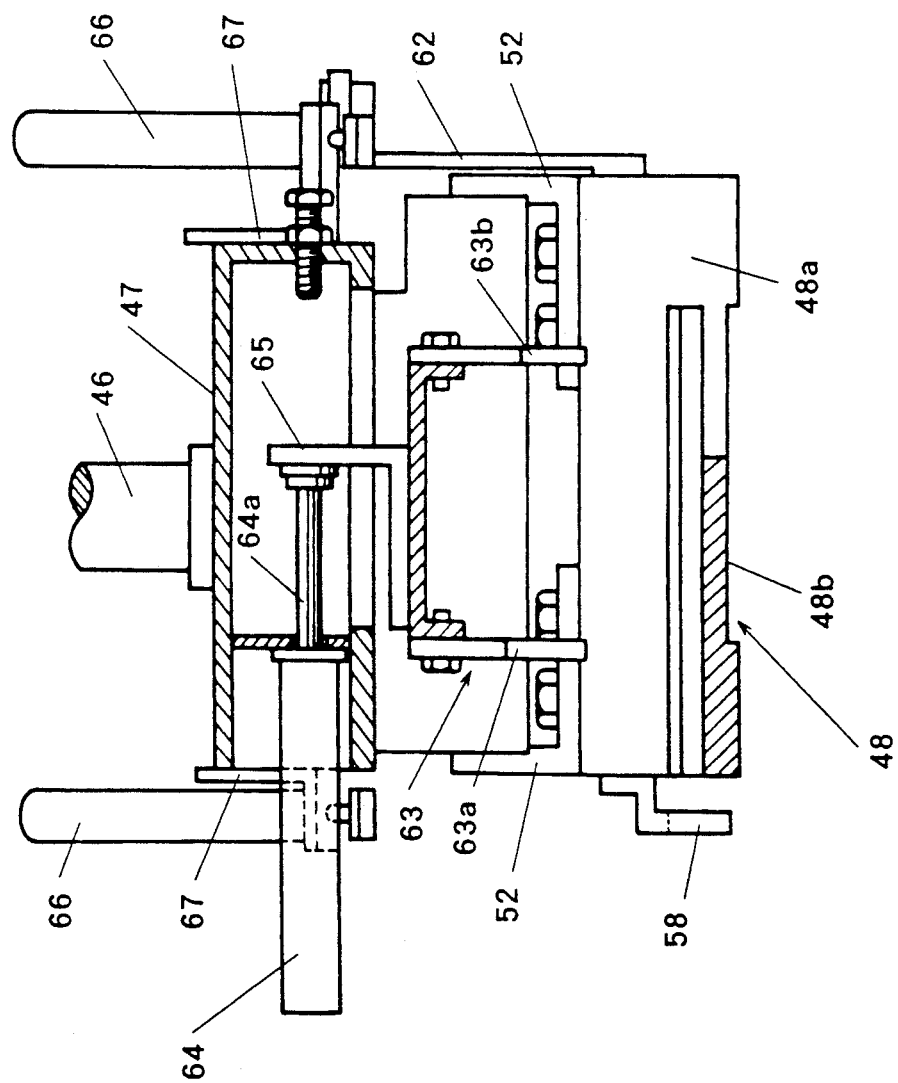
FIG. 10 is a cross-sectional view showing the main structure of the carrier and the jig, taken on the line X—X of FIG. 8.

The jig 48 is described in detail according to FIGS. 8 through 10. The jig 48 has a bottom plate 48b joined with the side walls 48a, 48a for holding the dies 4 and punches 7. Pairs of support members 56a, 56a are mounted on the bottom plate 48b, each pair corresponding to the shape and size of the die 4 or the punch 7 and for securely supporting the die 4 or the punch 7. Locating pins 57, 57 (see FIGS. 5 and 9) fixed at predetermined positions on the both sides of the die block 3 are fitted into engagement pieces 58, 58 fixed to the front face of the side walls 48a, 48a of the jig 48. Engagement projections 60 supported on the base 2 via mounting members 59 are fitted into engagement pieces 61 fixed to the upper rear face of the side walls 48a, 48a via mounting members 62 (see FIG. 9).

The carrier 47 has plural engagement members 63; each works to detach the corresponding die 4 from the die block 3 or the corresponding punch 7 from the punch holder 6, and attach a new die 4 or punch 7 previously carried on the jig 48 to the die block 3 or the punch holder 6. Each engagement member 63 has an engagement portion 63a on one side thereof for fitting into a groove 4a (see FIGS. 9 and 13) formed on the circumference of the die 4, and another engagement portion 63b on the other side thereof for fitting into a groove 7a (see FIG. 13) formed on the circumference of the punch 7. Plural driving cylinders 64 are further fixed to predetermined positions of the carrier 47 for driving the engagement members 63 in a given direction. Each engagement member 63 is connected to each driving cylinder 64 via a joint member 65 fixed at the end of a piston rod 64a of each driving cylinder 64. The engagement member 63 is moved back and forth with a given stroke of the piston rod 64a of the driving cylinder 64.

Figure 13:
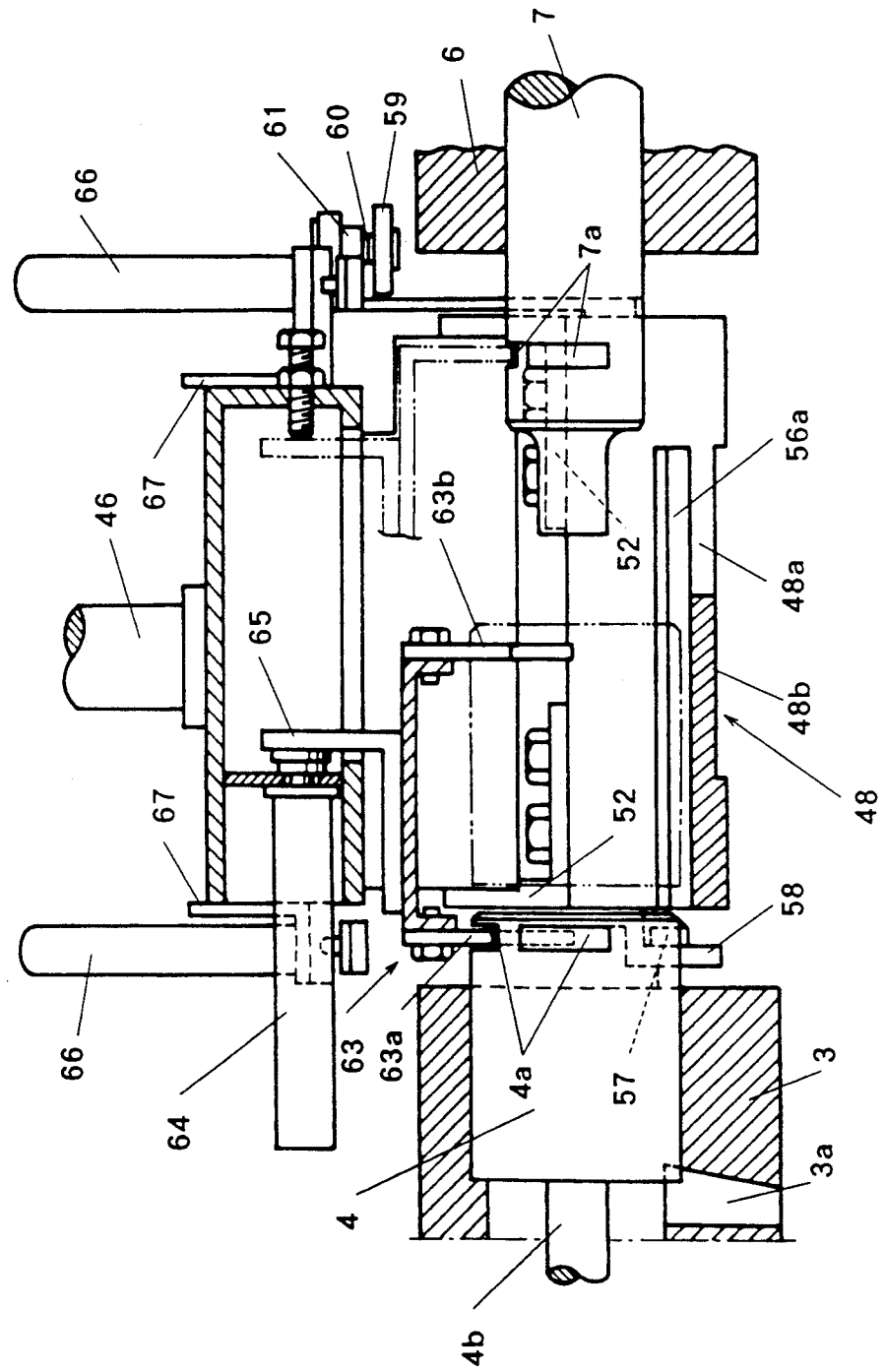
FIG. 13 is an enlarged cross-sectional view showing an example of tool replacement, detachment of the dies, by the automatic tool replacement system of the present invention.

Cylinders 66 are respectively attached to the front and back faces of the carrier 47 via brackets 67 which are moved to the attachment positions of the dies 4 or the punches 7 after detachment thereof for detecting left-out of the die 4 on the base 2 or the punch 7 on the ram 5 or a knock out pin 4b inserted into the axis thereof (see FIG. 13). Namely the cylinders 66 function as a detector.

The first replacement tool station B has a turntable 68, as shown in FIGS. 1 through 3, for resting and turning a material transfer unit 20 detached from the base 2 and a replacement of the material transfer unit 20. Cylinders 69 are provided for the turntable 68 to lift the front face of the material transfer unit 20 on the turntable 68. The second replacement tool station C has a support 9a for conveying the bar cutter and plural pairs of supporting members 70, 70 for conveying the jig 48. The jig 48 without the die 4 or the punch 7 and with a new die 4 or a punch 7 for replacement is carried on the supporting members 70.

Figure 11:
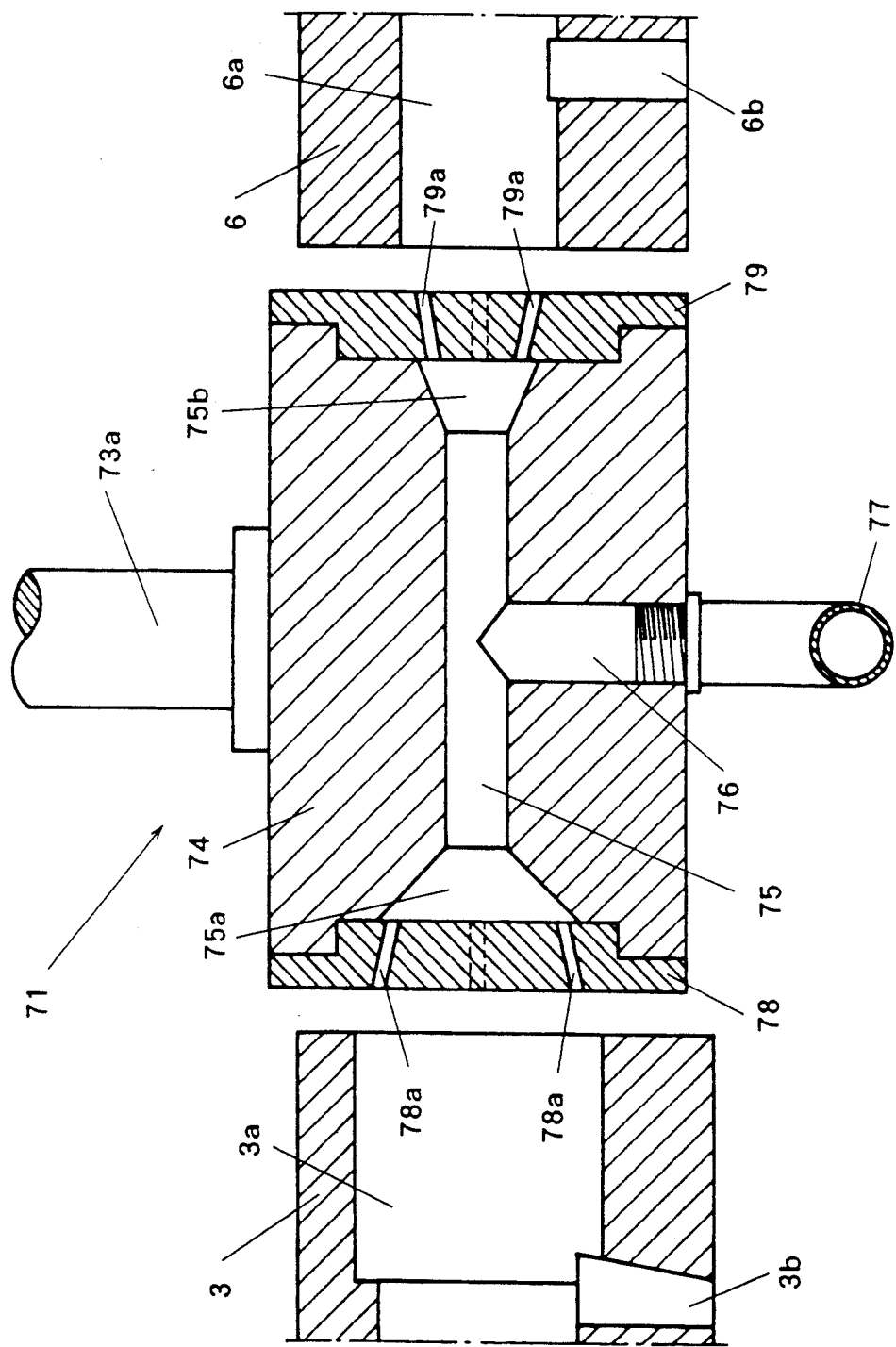
FIG. 11 is an enlarged cross-sectional view showing the main structure of a cleaning unit.

A cleaning unit 71 movable on the rails 42, 42 of the conveyor 40 is attached to the side of the press station A as shown in FIGS. 1 and 2. The cleaning unit 71 includes: a carrier 72 movable on the rails 42, 42; and a main body 74 supported on the lower end of a piston rod 73a of a cylinder 73 fixed to the carrier 72. As seen in FIG. 11, the main body 74 has a supply conduit 75 with openings 75a and 75b formed on both ends thereof and a connection pipe 77 for supplying compressed air to the conduit 75 through a joint passage 76. The openings 75a and 75b are opposed to an attachment hole 3a for each die 4 on the die block 3 and an attachment hole 6a for each punch 7 on the punch holder 6, respectively. A sealing member 78 with plural holes 78a and a sealing member 79 with plural holes 79a directed toward the attachment hole 3a or 6a are disposed at each front face of the openings 75a and 75b. The die block 3 and the punch holder 6 respectively include outlets 3b and 6b connecting to the attachment holes 3a and 6a. In the cleaning unit 71 thus constructed, compressed air or high pressure cleaning oil supplied into the supply conduit 75 through the connection pipe 77 is sprayed toward the attachment hole 3a or 7a through the plural holes 78a or 79a. Accordingly, any dust, slug, and undesirable matters are removed from the attachment hole 3a or 7a after the corresponding die 4 or punch 7 is detached, and discharged through the outlet 3b or 6b.

Figure 12:
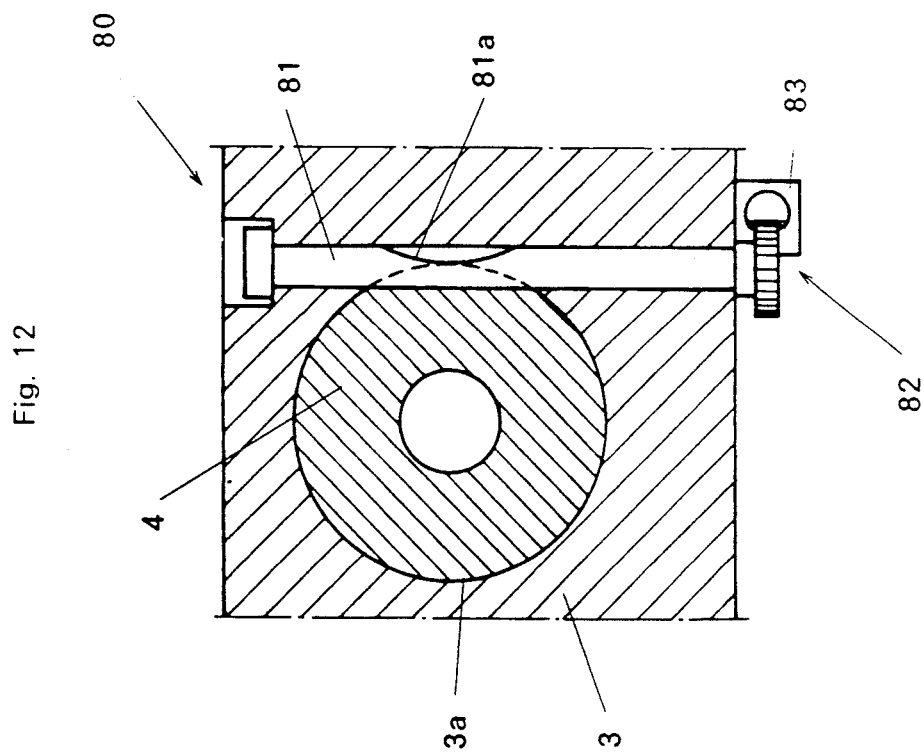
FIG. 12 is an enlarged cross-sectional view showing an example of a locking mechanism fixing a die onto a die block.

A locking mechanism 80 is formed between each die 4 and die block 3 for fixing the die 4 to the die block 3 as shown in FIG. 12. The locking mechanism 80 has: a lock shaft 81 running vertical through the die block 4 and grazing the die attachment hole 3a; and a cylinder 83 for rotating the lock shaft 81 with a rack and pinion 82. The lock shaft 81 has an arc cut 81a corresponding to the attachment hole 3a. When the lock shaft 81 other than the part of the arc cut 81a passes through the die attachment hole 3a, the die 4 cannot be detached from the attachment hole 3a but fixed in the die block 3. The die 4 is detachable from the attachment hole 3a when the arc cut 81a of the lock shaft 81 coincides with the attachment hole 3a by rotating the lock shaft 81. Each punch 7 and the punch holder 6 have a similar mechanism.

Operation of the automatic tool replacement system of the embodiment is explained now.

A die or dies 4 or a punch or punches 7 mounted on the base 2 or the ram 5 are replaced in the following manner. The first moving body 43 is moved from the position shown in FIG. 1 to above the press station A in the direction X along the rails 42, 42. The rods 46 suspended from the second moving body 44 are projected downward by the cylinder 45, and the carrier 47 descends with the jig 48 integrally supported on the carrier 47 by the first engagement unit 49. When the jig 48 comes between the front of the die block 3 and the same of the punch holder 6 as shown in FIG. 13. Each engagement pin 57 fixed to the front face of the die block 3 is then fitted into each engagement piece 58 disposed at the front face of the side wall 48a of the jig 48, and each engagement projection 60 fixed to the base 2 via the mounting member 59 is fitted into each engagement piece 61 disposed at the upper rear end of the side wall 48a of the jig 48. The jig 48 is thus securely fixed at a predetermined position between the die block 3 and the punch holder 6, and the engagement portion 63a of each engagement member 63 is fitted in the groove 4a formed on the circumference of each die 4. The engagement member 63 corresponding to the die 4 to be replaced is then driven toward the punch 7 by the piston rod 64a of the driving cylinder 64. The die 4 to be replaced is engaged with the engagement portion 63a of the engagement member 63 and accordingly detached from the die block 3. The detached die 4 is securely carried on the support members 56a mounted on the bottom 48b of the jig 48 as shown by the broken line in FIG. 13.

The carrier 47 with the jig 48 is lifted to a predetermined position by the rods 46. The carrier 47 is then transported to the second replacement tool station C along the rails 42, 42 by the first moving body 43, and the carrier 47 and the jig 48 are moved to a predetermined position above the supporting members 70 by the second moving body 44. The carrier 47 and the jig 48 are then descended, and connection between the carrier 47 and the jig 48 by the first engagement unit 49 is released. Here the jig 48 with the die 4 detached from the die block 3 is supported on the supporting members 70. The first moving body 43 and the second moving body 44 are then moved, and another jig 48 with a new die 4 for replacement supported on the supporting members 70 is connected with the carrier 47 by the first engagement unit 49. The carrier 47 and the jig 48 with the new die 4 are then transported to the station A and descended there so that the jig 48 is placed at a predetermined position between the die block 3 and the punch holder 6. The new die 4 engaged with the engagement member 63 is attached to the die block 3 by driving the driving cylinder 64 in the reverse manner to the above.

The punch 7 attached to the front face of the ram 5 via the punch holder 6 is replaced in the same manner, that is, by driving the corresponding engagement member 63 by the driving cylinder 64 as shown by the broken line in FIG. 13.

Any number of the dies 4 or the punches 7 are replaceable with new ones by driving the corresponding engagement members 63 by the driving cylinder 64. Namely, worn-out one or plural dies 4 or punches 7 may be replaced, or alternatively, all of the dies 4 or the punches 7 for press-forming products of different shapes. As described above, replacement of the dies 4 or the punches 7 is efficiently accomplished simply by moving the carrier 47 and the jig 48 supported thereto by the first engagement unit 49 between the press station A and the second replacement tool station C.

The material transfer unit 20 is replaced in the following manner. The carrier 47 is moved to the attachment position of the material transfer unit 20 on the base 2, and the piston rod 51a of each cylinder 51 in the first engagement unit 49 is fitted into each engagement piece 21b fixed to each arm 21a of the material transfer unit 20. Thus the material transfer unit 20 is detached from the base 2 in the press station A, and the carrier 47 is transported to the first replacement tool station B with the detached material transfer unit 20. A new material transfer unit 20 for replacement previously placed on the first replacement tool station B is then connected to the carrier 47 by the first engagement unit 49, and the carrier 47 with the new material transfer unit 20 is moved back to the attachment position on the base 2. The material transfer unit 20 thus transported is then attached to the predetermined position on the base 2.

Replacement of the bar cutter 9 is accomplished in a similar manner to the above. The carrier 47 is moved to the attachment position of the bar cutter 9 on the base 2, and the piston rod 55a of each cylinder 55 in the second engagement unit 53 is fitted in the engagement piece 10a fixed to the quill case 10 of the bar cutter 9 as shown in FIG. 9. Here the bar cutter 9 is detached from the base 2 and then the carrier 47 is moved to the support 9a of the second replacement tool station C. A replacement of the bar cutter 9 previously placed on the second replacement tool station C is then connected to the carrier 47 with the second engagement unit 53, and the carrier 47 with the new bar cutter 9 is moved back to the attachment position on the base 2. The new bar cutter thus transported is then attached to the predetermined position on the base 2.

Since the first replacement tool station B has the turntable 68 for turning the material transfer unit 20 and the cylinders 69, 69 for lifting an end of the material transfer unit 20 on the turntable 68, replacement of wear-out parts or maintenance and inspection of the material transfer unit 20 is efficiently accomplished.

In the embodiment, the jig 48 is detachable from the carrier 47 by the first engagement unit 49. Accordingly, as shown in FIG. 8, part or all of the dies 4 or the punches 7 in the same or different shapes and sizes are efficiently replaced by using an appropriate jig 48 corresponding to the number, shape, and size of the dies and punches.

When a through hole 60a is formed on the engagement projection 60 as shown in FIG. 9 and the hole through 60a is connected to a compressed air source (not shown) through connection pipes or others, dust or undesirable matters in the engagement piece 61 fixed to the jig 48 are effectively removed, and thereby the engagement projection 60 is accurately and securely fitted into the engagement piece 61. When a pressure sensor is disposed in the connection pipe connecting the through hole 60a to the compressed air source, secure connection between the engagement projection 60 and the engagement piece 61 is detected by the rise in the pressure. The engagement pins 57, 57 fixed to the front face of the die block and the corresponding engagement pieces 58, 58 may have a similar structure.

In the embodiment, the cylinders 66 working as a detector assuredly detect left-out of the knock out pin 4b inserted into the die 4 or the punch 7 on the base 2 or the ram 5. When the cylinder 66 detects the left-out, movement of the carrier 47 is inhibited. Accordingly, damage to the die 4, the punch 7, or the jig 48 is effectively prevented.

The cleaning unit 77 cleans the attachment position of the dies 4 or the punches 7 on the base 2 or the ram 5 so as to effectively remove dust or slug adhered to the attachment position which may cause some damage. Accordingly, new dies 4 or the punches 7 are smoothly and accurately attached to the base 2 or the ram 5.

As described above, the automatic replacement system of the present invention attains efficient replacement of the bar cutter and the material transfer unit as well as part or all of the dies and punches. Replacement is accomplished simply by moving the carrier and the jig supported thereby via the engagement unit between the multi-stage press station and the replacement tool station disposed in the vicinity of the press station. The invention thus saves both time and labor and improves the working efficiency of the multi-stage press forming machine.

The locating device included in the automatic tool replacement system precisely determines the position of the jig on the press station even when the first engagement unit connecting the jig with the carrier is worn. Thus the jig is always accurately located on the press station, and the dies or punches are assuredly detached from and attached to the base or the ram.

The automatic tool replacement system of the invention further includes the detector for detecting a knock out pin inserted into the die or the punch on the base or the ram. When the detector detects left-out of the die or the punch or any part thereof, transportation of the jig is inhibited. Accordingly, damage to the die, the punch, or the jig is effectively prevented.

The cleaning unit cleans the attachment site of the dies or the punches on the base or the ram so as to effectively remove dust or slug adhered there which may cause damage. Accordingly, the new dies or the punches are smoothly and accurately attached to the base or the ram.

In the automatic replacement system with the first replacement tool station for the material transfer unit and the second replacement tool station for the jig and the bar cutter, various maintenance and inspection procedures are efficiently performed for respective constituents of the material transfer unit or the bar cutter. When the first replacement tool station further includes the turntable for turning the material transfer unit and the lifting device for lifting an end of the material transfer unit supported on the turntable, replacement of the material transfer unit and maintenance or inspection thereof are much more efficiently accomplished.

What is claimed is:

1. In an automatic tool replacement system for a multi-stage press forming machine comprising:

a multi-stage press station with plural dies disposed at given locations on a base, and plural punches each opposed to the corresponding die and mounted on the front face of a ram moving forward and backward against the dies;

a bar cutter detachably mounted on the base for cutting a material bar supplied from a back end of the base in given lengths; and a material transfer unit for successively feeding the material bar cut in given lengths to the multi-stage press station, whereby the cut pieces are press-worked step by step to form products in a given shape, the automatic tool replacement system is characterized in that the system further comprises:

a replacement tool station located in the vicinity of the multi-stage press station;

a carrier for conveying tools including the dies, the punches, the material transfer unit, and the bar cutter between the multi-stage press station and the replacement tool station;

a jig for holding the plural dies or punches in a disposition corresponding to the locations of the dies on the base or the punches on the ram;

plural engagement members corresponding to the plural dies or punches, each being attached to the carrier for engaging with the corresponding die or punch;

driving means mounted on the carrier for driving each engagement member so as to transfer the corresponding die or punch between the base or ram and the jig;

first engagement means for detachably connecting the carrier with the jig or the material transfer unit; and second engagement means for detachably connecting the carrier with the bar cutter.

2. An automatic tool replacement system as claimed in claim 1, where the carrier is transported on a pair of parallel rails.

3. An automatic tool replacement system as claimed in claim 1, further comprising locating means having a locating member fixed at a predetermined position of the base and an engagement member fixed at a predetermined position of the jig for engaging with the locating member for determining a proper position of the jig to the multi-stage press station.

4. An automatic tool replacement system as claimed in claim 1, further comprising a detector mounted on the carrier or the jig for detecting left-out of the die or the punch or any part thereof on the base or the ram after detachment of the die or the punch from the base or the ram.

5. An automatic tool replacement system as claimed in claim 4, where the detector detects a knock out pin inserted in the die or the punch.

6. An automatic tool replacement system as claimed in claim 1, further comprising a cleaning unit, which is moved to the multi-stage press station after detachment of the die or punch and cleans the attachment position on the base for the die or on the ram for the punch.

7. An automatic tool replacement system as claimed in claim 6, where the cleaning unit cleans the attachment position on the base or the ram by spraying compressed air to the base or the ram.

8. An automatic tool replacement system as claimed in claim 6, where the cleaning unit cleans the attachment position on the base or the ram by spraying high-pressure cleaning oil to the base or the ram.

9. In an automatic tool replacement system for a multi-stage press forming machine comprising:

a multi-stage press station with plural dies disposed at given locations on a base, and plural punches each opposed to the corresponding die and mounted on the front face of a ram moving forward and backward against the dies;

a bar cutter detachably mounted on the base for cutting a material bar supplied from a back end of the base in given lengths; and a material transfer unit for successively feeding the material bar cut in given lengths to the multi-stage press station, where the cut pieces are press-worked step by step to form products in a given shape, the automatic tool replacement system is characterized in that the system further comprises:

a jig for holding the plural dies or punches in a disposition corresponding to the locations of the dies on the base or the punches on the ram;

a first replacement tool station for the material transfer unit;

a second replacement tool station for the jig and the bar cutter a carrier for conveying tools including the dies, the punches, the material transfer unit, and the bar cutter between the multi-stage press station and the first replacement tool station or the second replacement tool station;

plural engagement members corresponding to the plural dies or punches, each being attached to the carrier for engaging with the corresponding die or punch;

driving means mounted on the carrier for driving each engagement member so as to transfer the corresponding die or punch between the base or ram and the jig;

first engagement means for detachably connecting the carrier with the jig or the material transfer unit; and second engagement means for detachably connecting the carrier with the bar cutter.

10. An automatic tool replacement system as claimed in claim 9, where the first replacement tool station further comprises a turntable for the material transfer unit and lifting means for lifting an end of the material transfer unit on the turntable.

11. An automatic tool replacement system as claimed in claim 9, where the carrier is transported on a pair of parallel rails.

12. An automatic tool replacement system as claimed in claim 9, further comprising locating means having a locating member fixed at a predetermined position of the base and an engagement member fixed at a predetermined position of the jig for engaging with the locating member for determining a proper position of the jig to the multi-stage press station.

13. An automatic tool replacement system as claimed in claim 9, further comprising a detector mounted on the carrier or the jig for detecting left-out of the die or the punch or any part thereof on the base or the ram after detachment of the die or the punch from the base or the ram.

14. An automatic tool replacement system as claimed in claim 9, further comprising a cleaning unit, which is transported to the multi-stage press station after detachment of the die or punch and cleans the attachment site of the base for the die and the ram for the punch.

15. An automatic tool replacement system as claimed in claim 14, where the cleaning unit cleans the attachment position on the base or the ram by spraying compressed air to the base or the ram.

16. An automatic tool replacement system as claimed in claim 14, where the cleaning unit cleans the attachment position on the base or the ram by spraying high-pressure cleaning oil to the base or the ram.

* * * * *